Feb. 22, 1955   G. R. DEMPSTER ET AL   2,702,645
LIFT TRUCK
Filed July 24, 1952   2 Sheets-Sheet 1
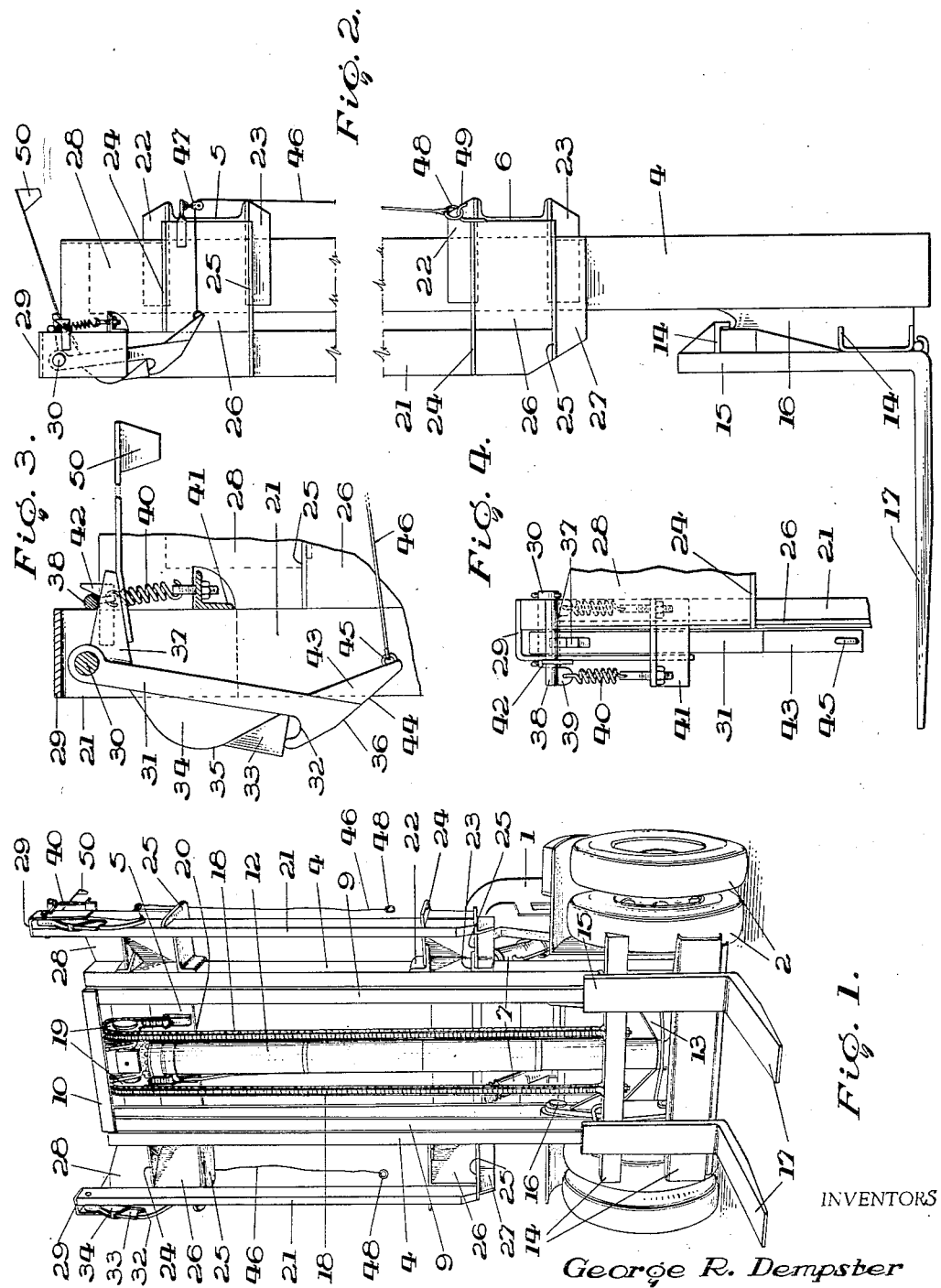
INVENTORS
George R. Dempster
Harry W. Jones
BY Cameron, Kerkam + Sutton
ATTORNEYS

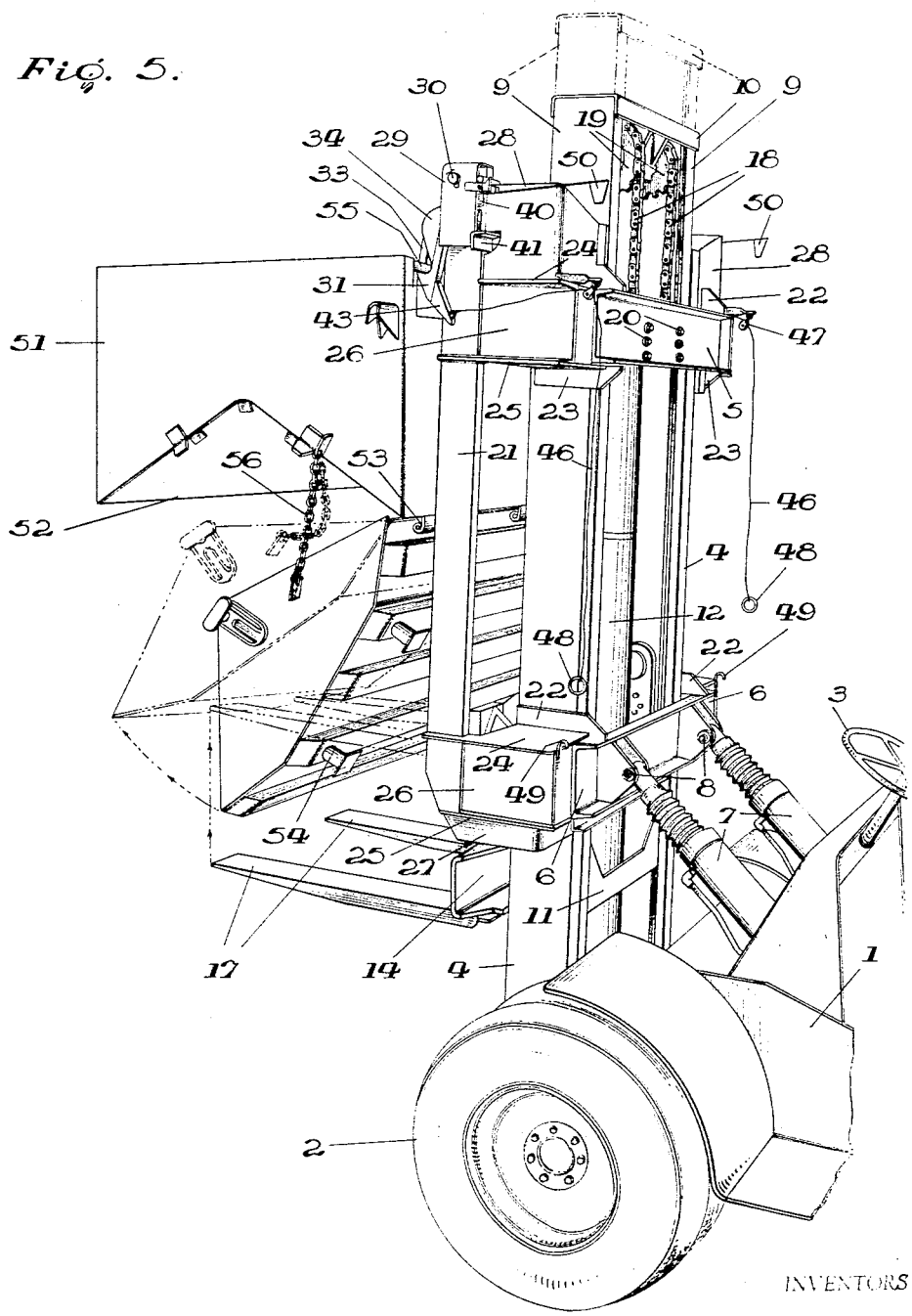

United States Patent Office 2,702,645
Patented Feb. 22, 1955

2,702,645

LIFT TRUCK

George R. Dempster and Harry W. Jones, Knoxville, Tenn., assignors to Dempster Brothers, Incorporated, Knoxville, Tenn., a corporation of Tennessee Application July 24, 1952, Serial No. 300,732

10 Claims. (Cl. 214—317)

This invention relates to material handling devices of the type commonly termed "lift trucks" wherein a movable truck body is provided with an upright frame and a power-operated load-carrying device is movable upwardly and downwardly on said frame for handling various materials.

A lift truck of the above mentioned type usually comprises a self-propelled vehicle powered by a suitable motor and carrying the aforesaid upright frame at its forward end, and the load-lifting device, which is slidable vertically on the upright frame, conventionally includes a vertical frame or carriage having arms or like means projecting horizontally therefrom to form a "fork" or other load-supporting platform. This device can be elevated on the upright frame in any suitable manner, preferably by power means such as a hydraulic cylinder, an electric motor, gear connections to the prime mover of the truck, etc. Where high lift is desired, a telescoping truck frame can be employed having an elevator section slidable vertically within the stationary upright frame and adapted to form an extension thereof, the load-lifting device then being slidable on the elevator section. In a typical arrangement of the latter type, the device is lifted by chains or the like which pass over sprockets at the top of the elevator section and are then anchored to the stationary frame. In this case, upward movement of the elevator section is accompanied by twice as much upward movement of the load-lifting device.

Lift trucks of the type characterized above are well known and are widely used in stacking and moving materials in warehouses, in loading and unloading railroad cars, in transporting materials from place to place, and for many other similar purposes. But also it is often desirable to utilize such a lift truck for handling and dumping containers, for example, containers of the type shown in U. S. Patent No. 2,179,779. Accordingly the main object of the present invention is to provide improved lift truck design and construction whereby a truck can be used with equal facility either for the ordinary purposes of a lift truck or for the purpose of elevating, transporting and dumping such a container.

One embodiment of the invention has been illustrated in the accompanying drawings, but it is to be expressly understood that said drawings are for purposes of illustration only and are not to be taken as a definition of the limits of the invention, reference being had to the appended claims for this purpose.

In the drawings,

Fig. 1 is a perspective view of a lift truck embodying the invention;

Fig. 2 is a detail side view of the upper part of the truck frame;

Figs. 3 and 4 are respectively a side view and a rear view of suitable hook mechanism for suspending and dumping a container; and Fig. 5 is a perspective view illustrating the use of the truck for dumping a container.

In the form shown, the truck comprises a suitable body 1 which is self-propelled by any suitable motor (not shown) and runs on wheels including, for example, dual forward wheels 2, the truck being steered by means of a steering wheel 3. Mounted at the front of the truck is an upright frame comprising a pair of laterally spaced uprights 4 that are connected together in any suitable manner as by means of the upper and lower channels 5 and 6. This frame can be pivotally mounted on the truck body, in which case it can be maintained in a vertical or substantially vertical position by any suitable means such as the hydraulic cylinders 7 carried by the truck body and pivotally connected at 8 to the lower transverse channel member 6 mentioned above.

Where high lift is desired, an elevator frame section is mounted to slide vertically between the uprights 4. In the form shown, this elevator frame section comprises a pair of spaced uprights 9 each located inside and having sliding engagement with one of the uprights 4, the uprights 9 being suitably connected together as by means of a top connection 10 and a lower tie 11. The elevator frame 9 can be lifted relative to the truck body by the extension of a suitable telescopic hydraulic cylinder 12, the lower end of which is mounted on a seat 13 connected between the uprights 4 and the upper end of which engages the cross connection 10 between the elevator frame uprights 9.

The load-carrying device typically comprises a backing frame or carriage including transverse members 14 and vertical members 15, said carriage having sliding engagement within the elevator frame uprights 9 by means of any suitable extension 16. The vertical frame members 15 are bent at right angles and extended forwardly at 17 to provide a lifting fork or platform. The load-carrying device is lifted by means of chains 18 each fastened at one end to the carriage 14, 15 and running over a sprocket wheel 19 at the top of the elevator frame section, the other end of each chain being secured at 20 to the upper transverse channel 5 of the truck frame. Accordingly, when the cylinder 12 is extended, the elevator frame 9, 10 is elevated relative to the truck frame 4 as indicated in Fig. 5. At the same time the load-carrying fork 17 moves upwardly with the elevator frame and also relative to the elevator frame, its total movement being twice that of the elevator frame.

Mounted on each of the frame uprights 4 and extending laterally therefrom are vertically spaced supporting structures for a vertical skid 21. As shown in Fig. 2, the skids 21 project forwardly beyond the frame uprights 4 and the elevator uprights 9 and their outer skid surfaces are in approximately the same place as the vertical members 15 of the fork carriage which slides up and down between said skids 21. The four supporting structures for the skids 21 may be of any suitable type and preferably are substantially the same so that only one need be described. Angles 22 and 23 are secured to the outer face of the upright 4 with their horizontal flanges extending over and secured to the upper and lower flanges of the frame channels 5 or 6 as the case may be. These angles are connected with and support the skid 21 by means of any suitable structure, here shown as including horizontal plates 24 and 25 secured to and extending laterally from the horizontal flanges of the angles 22, 23 and at least one vertical plate 26 connecting the horizontal plates 24, 25 and suitably connected to the skid 21. If desired, the lower skid supporting structure may be further strengthened by suitable depending ribs 27 and the upper supporting structure by suitable upwardly projecting plates 28.

At the top of each skid is mounted a suitable automatic container-supporting hook, preferably of the type shown in U. S. Patent No. 2,404,830. For this purpose an angular bracket 29 is secured to the top of the skid 21 and extends downwardly in parallel spaced relation with its outer face to provide bearings for a pivot pin 30 on which the shank 31 of the hook is suspended. The bight 32 of the hook (see Fig. 3) is normally masked by a suitable shuttle plate 33 slidable between guide plates 34 mounted on the shank of the hook, the edges 35 of these guide plates and the edge 36 of the lower part of the hook constituting cam surfaces which operate in the manner described hereinafter.

The hook is capable of swinging about its pivot 30 between an operative position such as shown in Fig. 3, in which the hook projects in advance of the skid 21, and an inoperative position such as shown in Fig. 2, in which the hook is withdrawn so that it is masked by the skid 21. Suitable means are provided for biasing the hook to one or the other of these positions, preferably to the operative position shown in Fig. 3. For this purpose a hook operating plate or arm 37 extends rearwardly from the shank 31 adjacent its upper end, and is urged downwardly at its outer end by means of a spring or springs so as to swing the hook to the position shown in Fig. 3. For example, a pull bar 38 extends across the top of the arm 37 and is provided with tabs 39 at each end, springs 40 extending between these tabs and an angle bracket 41 secured to the skid 21. The lowermost position of the pull bar 38 can be determined by any suitable stop 42 secured to the skid 21, the weight of the hook tending to swing it about its pivot 30 in a direction to maintain the arm 37 in engagement with the pull bar 38 when the latter is in its limiting position against the stop 42.

It will be seen that the hook can swing further inwardly in operation as described hereinafter, moving the pull bar 38 upwardly and stretching the springs 40. In case the operation of the hook is not desired, moreover, the hook can be swung completely behind the edge of the skid 21 as shown in Fig. 2 and secured in this position by any suitable means. For instance, a tailpiece 43 is connected to the lower end of the hook, its surface 44 forming a continuation of the cam surface 36. An eye 45 is provided at the end of the tailpiece 44 for connection of an operating rope 46 whereby the hook can be pulled back and retained in the position shown in Fig. 2 when desired. For convenience, the rope 46 may pass around a small pulley 47 and thence downwardly to a point where it can easily be reached, terminating in a ring 48 or like means adapted for engagement with a hook 49 mounted on the lower skid supporting structure.

The operation of the device will be understood by the foregoing description. Briefly summarized, when only the usual lift truck operation is desired, the ring 48 is preferably engaged with its hook 49 so that the automatic hook 31 is completely retracted and inoperative as shown in Fig. 2. This condition can be indicated visually to the driver by a suitable indicator such as a small flag 50 connected to the hook operating arm 37. The truck can now be driven up to the material to be handled, the arms or fork 17 inserted under the material, and the cylinder 12 operated to lift the material for stacking, transportation to another point, etc. When large sized articles are handled at high elevation, the load-lifting fork moves up between the skids 21 which assist the vertical members 15 of the fork carriage by engaging the load outwardly of the carriage itself and thus provide more stable support.

On the other hand, when it is desired to use the truck for handling and dumping a container, the ring 48 is disengaged from the hook 49 to allow the automatic hook 31 to swing outwardly to the position shown in Fig. 3 and the operation then proceeds as illustrated in Fig. 5. This figure shows a drop-bottom container 51 of known type, the bottom 52 being hinged to the rear edge of the container at 53 and being provided with feet 54 for supporting the container above the ground sufficiently to permit the introduction of the lifting fork 17 thereunder. Thus the container can be lifted by the fork to the position shown in Fig. 5 in which rods 55 at the upper rear corners of the container serve as bails to be engaged in the hooks 31. The operation of these hooks is the same as described in Patent No. 2,404,830. As the container moves upwardly, the bail rods 55 first engage the cam surfaces 44, 36 and swing the hook inwardly, and then lift the shuttle plates 33. If upward movement continues, the bail rods ride over the cam surfaces 35, and the shuttle plates drop back and mask the hooks when the container moves downwardly. Thus it is not essential to use the pull ropes 46.

If, however, upward movement of the container is only enough to lift the shuttle plates and to clear the hook throats 32, then the hooks swing outwardly under the influence of the springs 40. On subsequent downward movement, therefore, the container will be suspended by the hooks, and when the arms 17 are further lowered to the position shown in Fig. 5 or below, the bottom 52 of the container drops open to the extent permitted by the chain 56 and the contents of the container are dumped. Then when the arms 17 are again elevated as indicated in dotted lines in Fig. 5, the bottom 52 first swings to its closed position and the container is then lifted off the automatic hooks and can be lowered without reengaging the hooks as described above. The projection of the skids 21 beyond the frame 4, 9 permits the fork carriage to move upwardly behind the container body while it is closing the drop bottom of the container.

While only one embodiment of the invention has been described and illustrated in the drawings, it will be understood that the invention is not restricted to this embodiment and that various changes can be made in the form, details of construction, and arrangement of the parts without departing from its spirit. Reference should therefore be had to the appended claims for a definition of the limits of the invention.

What is claimed is:

1. A lift truck comprising a body, a frame comprising spaced uprights mounted on said body, an elevator frame slidable between said uprights, a load-lifting device elevatable by upward movement of said frame and comprising a vertical carriage structure and load-supporting means carried thereby, fixed skids mounted on the outer sides of said uprights and projecting beyond said frames and at least to the outer side of said vertical carriage structure for slidable engagement by a load on said device and hook means secured to said skids adjacent the top thereof and adapted to engage and support a load elevated thereto by said device independently of said device, said skids extending vertically downward for engagement by the load supported by said hook, and said carriage structure being movable vertically behind the hook-supported load.

2. A lift truck comprising a body, a frame comprising spaced uprights mounted on said body, an elevator frame slidable between said uprights, a load-lifting device elevatable by upward movement of said frame and comprising a vertical carriage structure and load-supporting means carried thereby, skids mounted on the outer sides of said uprights and projecting beyond said frames and at least to the outer side of said vertical carriage structure for slidable engagement by a load on said device, said carriage structure being movable upwardly between said load and said frames, and hook means mounted on said skids adjacent the top thereof and movable between an operative position projecting beyond the skid surfaces to engage and support a load elevated by said device and an inoperative position withdrawn behind the skid surfaces.

3. A lift truck as defined in claim 2, including means biasing said hook means to one of said positions and retainer means for holding said hook means in the other of said positions.

4. A lift truck as defined in claim 3, including an indicator connected to and movable with said hook means for indicating the position thereof.

5. A lift truck comprising a body, spaced upright ways mounted on said body, an elevator frame slidable between said ways, a load-lifting device elevatable by upward movement of said frame and comprising a vertical carriage slidable on said frame and load-supporting means projecting horizontally from said carriage, supports projecting laterally from said ways, fixed skids mounted on said supports and projecting forwardly beyond said ways and at least to the outer side of said vertical carriage to engage slidably and to provide backing support for a load carried by and projecting laterally from said device and hook means secured to said skids adjacent the top thereof and adapted to engage and support a load elevated thereto by said device independently of said device, said skids extending vertically downward for engagement by the load supported by said hook means, and said carriage structure being movable vertically behind the hook-supported load.

6. A lift truck as defined in claim 5, said hook means being movable between an operative position projecting beyond said skids and an inoperative position masked by said skids, and means for maintaining said hook means in a desired one of said positions.

7. A lift truck as defined in claim 5, including resilient means for moving said hook means to an operative position projecting beyond said skids, and retainer means for holding said hook means in an inoperative position masked by said skids.

8. A lift truck as defined in claim 7, including an indicator connected to and movable with said hook means for indicating the position thereof.

9. In a lift truck of the type comprising a truck body, a load-carrying device comprising a horizontal load support and a carriage extending vertically above said support, and device-elevating mechanism including upright ways mounted on said body and means for moving said carriage along said ways to an elevated position, the combination therewith of upright, laterally spaced skids mounted on said body and projecting beyond said ways for sliding engagement with a load carried by said device, and hook means carried by said skids for engaging and suspending a load elevated thereto by said device, said device being movable downwardly relative to a suspended load but the extent of projection of said skids beyond said ways being at least equal to the thickness of said vertically extending carriage whereby said device may be reelevated to load-supporting position with said carriage entering the space between said ways and said suspended load.

10. A lift truck as defined in claim 9, including resilient means for moving said hook means to an operative position projecting beyond said skids, and retainer means for holding said hook means in inoperative position masked by said skids.

References Cited in the file of this patent

UNITED STATES PATENTS

| | | |
|---|---|---|
| 1,256,401 | Ward | Feb. 12, 1918 |
| 1,768,149 | Remde | June 24, 1930 |
| 2,164,739 | Gerosa et al. | July 4, 1939 |
| 2,187,657 | Lambert | Jan. 16, 1940 |
| 2,357,548 | Randall | Sept. 5, 1944 |
| 2,437,806 | Dempster | Mar. 16, 1948 |
| 2,445,038 | Riemenschneider et al. | July 13, 1948 |
| 2,542,425 | Oliver | Feb. 20, 1951 |
| 2,606,680 | Herman | Aug. 12, 1952 |
| 2,611,497 | Backofen | Sept. 23, 1952 |